(12) United States Patent
Smith et al.

(10) Patent No.: US 10,203,692 B2
(45) Date of Patent: Feb. 12, 2019

(54) STRUCTURE FROM MOTION (SFM) PROCESSING FOR UNMANNED AERIAL VEHICLE (UAV)

(71) Applicant: King Abdullah University of Science and Technology, Thuwal (SA)

(72) Inventors: Neil G. Smith, Thuwal (SA); Mohamed Shalaby, Thuwal (SA); Luca Passone, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/327,917

(22) PCT Filed: Jul. 10, 2015

(86) PCT No.: PCT/US2015/039984
§ 371 (c)(1),
(2) Date: Jan. 20, 2017

(87) PCT Pub. No.: WO2016/053438
PCT Pub. Date: Apr. 7, 2016

(65) Prior Publication Data
US 2017/0205826 A1    Jul. 20, 2017

Related U.S. Application Data

(60) Provisional application No. 62/026,866, filed on Jul. 21, 2014.

(51) Int. Cl.
*G05D 1/00* (2006.01)
*B64C 39/02* (2006.01)
(Continued)

(52) U.S. Cl.
CPC ......... *G05D 1/0094* (2013.01); *B64C 39/024* (2013.01); *G01C 11/025* (2013.01);
(Continued)

(58) Field of Classification Search
CPC ................ G05D 1/0094; B64C 39/024; B64C 2201/123; B64C 2201/127; G01C 11/025; G01C 21/165
See application file for complete search history.

(56) References Cited

U.S. PATENT DOCUMENTS

4,308,294 A * 12/1981 Rispoli ................ A23D 7/0053
426/564
5,557,397 A * 9/1996 Hyde ..................... G01C 11/02
356/2
(Continued)

FOREIGN PATENT DOCUMENTS

| CN | 102176003 | 11/2012 |
| EP | 2304688 | 10/2012 |
| EP | 2728308 A2 | 5/2014 |

OTHER PUBLICATIONS

Barsanti, et al., "3D Surveying and Modeling of Archaeological Sites—Some Critical Issues—", ISPRS Ann. Photogramm. Remote Sens. Spatial Inf. Sci., II-5/W1, 2013, 145-150.
(Continued)

*Primary Examiner* — Courtney D Heinle
(74) *Attorney, Agent, or Firm* — Billion & Armitage; Michael A. Collins

(57) ABSTRACT

A method of imaging an area using an unmanned aerial vehicle (UAV) collects a plurality of images from a sensor mounted to the UAV. The plurality of images are processed to detect regions that require additional imaging and an
(Continued)

updated flight plan and sensor gimbal position plan is created to capture portions of the area identified as requiring additional imaging.

6 Claims, 2 Drawing Sheets

(51) Int. Cl.
*G01C 11/02* (2006.01)
*G01C 21/16* (2006.01)

(52) U.S. Cl.
CPC ...... *G01C 21/165* (2013.01); *B64C 2201/123* (2013.01); *B64C 2201/127* (2013.01)

(56) References Cited

U.S. PATENT DOCUMENTS

| | | | | |
|---|---|---|---|---|
| 6,654,690 | B2* | 11/2003 | Rahmes | G06F 17/5004 702/5 |
| 6,690,978 | B1* | 2/2004 | Kirsch | G01S 5/0072 700/56 |
| 6,711,475 | B2* | 3/2004 | Murphy | G01C 11/02 701/3 |
| 6,952,212 | B2* | 10/2005 | Nister | G06T 17/00 345/474 |
| 7,127,348 | B2* | 10/2006 | Smitherman | G01C 11/02 701/409 |
| 7,363,157 | B1* | 4/2008 | Hanna | G01C 11/00 702/5 |
| 7,905,463 | B2* | 3/2011 | Burnham | F16M 11/123 248/177.1 |
| 8,427,505 | B2* | 4/2013 | Karp | G01C 11/06 345/630 |
| 8,477,190 | B2* | 7/2013 | Giuffrida | G01C 11/02 348/116 |
| 8,521,339 | B2* | 8/2013 | Gariepy | B64C 39/024 244/190 |
| 8,527,115 | B2* | 9/2013 | Greenfeld | G01C 11/02 382/108 |
| 8,682,504 | B2* | 3/2014 | Vos | G01C 11/02 701/3 |
| 2008/0215204 | A1* | 9/2008 | Roy | G05D 1/0044 701/28 |
| 2009/0068334 | A1* | 3/2009 | Hussein | A23C 9/1544 426/548 |
| 2012/0287274 | A1* | 11/2012 | Bevirt | H04N 7/185 348/144 |
| 2013/0317667 | A1* | 11/2013 | Kruglick | B64C 39/024 701/2 |
| 2014/0119716 | A1* | 5/2014 | Ohtomo | G01C 11/00 396/8 |

OTHER PUBLICATIONS

Brumana, et al., "Combined Geometric and Thermal Analysis from UAV Platforms for Archaeological Heritage Documentation", ISPRS Ann. Photogramm. Remote Sens. Spatial Inf. Sci., II-5/W1, 2013, 49-54.

Colomina, et al., "Towards a New Paradigm for High-Resolution Low-Cost Photogrammetry and Remote Sensing", Int. Arch. Photogrammetry Remote Sense. Spacial Inf. Sci., vol. 37, No. 3, 2008, 10201-1206.

Eisenbeiss, et al., "Investigation of UAV Systems and Flight Modes for Photogrammetric Applications", The Photogrammetric Record, 26(136), 2011, 400-421.

Fiorillo, et al., "3D Digitization and Mapping of Heritage Monuments and Comparison with Historical Drawings", ISPRS Ann. Photogramm. Remote Sens. Spatial Inf. Sci., II-5/W1, 2013, 133-138.

Hoppe, et al., "Online Feedback for Structure-from-Motion Image Acquisition", Proceedings of the British Machine Vision Conference (BMVC), Guildford, 2012, 1-12.

Hoppe, et al., "Photogrammetric Camera Network Design for Micro Aerial Vehicles", Proceedings of the Computer Vision Winter Workshop (CVWW), Mala Nedelja (Slovenia), Feb. 1-3, 2012, 1-8.

Irschara, et al., "Towards Fully Automatic Photogrammetric Reconstruction Using Digital Images Taken from UAVS", ISPRS TC VII Symposium—100 Yeras ISPRS, Vienna, Austria, IAPRS, vol. XXXVIII, Part 7A, Jul. 5-7, 2010, 65-70.

Remondino, "Heritage Recording and 3D Modeling with Photogrammetry and 3D Scanning", Remote Sensing, vol. 3, 2011, 1104-1138.

Remondino, et al., "UAV Photogrammetry for Mapping and 3D Modeling—Current Status and Future Perspectives—", IAPRSS &IS, Zurich, Switzerland, vol. XXXVIII, Part 1, 2011, 25-31.

Wendel, et al., "Automatic Fusion of Partial Reconstructions", ISPRS Ann. Photogramm. Remote Sens. Spatial Inf. Sci., I-3, 2012, 81-86.

Wenzel, et al., "Image Acquisition and Model Selection for Multi-View Stereo", Int. Arch. Photogramm. Remote Sens. Spatial Inf. Sci., XL-5/W1, 2013, 251-258.

"International Search Report and Written Opinion", International Application No. PCT/US2015/039984, Apr. 18, 2016, 12 pages.

Lucieer, et al., "Using a Unmanned Aerial Vehicle (UAV) to capture micro-topography of Antarctic Moss Beds", May 11, 2013.

Tonkin, et al., "The potential of small unmanned aircraft systems and structure-from-motion for topographic surveys: A test of emeerging integrated approaches at Cwm IDwal, North Wales", Geomorphology, Elsevier, Amsterdam, NL, Jul. 18, 2014, 35-43.

* cited by examiner

STRUCTURE FROM MOTION (SFM) PROCESSING FOR UNMANNED AERIAL VEHICLE (UAV)

TECHNICAL FIELD

The present disclosure relates to topographic imaging utilizing unmanned aerial vehicles.

BACKGROUND

Unmanned aerial vehicles (UAVs) have found use in a variety of commercial applications, from agriculture to surveillance. One of the more useful applications of UAVs has been found in pairing the UAV with imaging sensors (e.g., cameras) that allow the UAV to collect visual information for the purpose of creating topographic or three-dimensional (3D) models of an area or structure. Although satellites and/or airborne photogrammetry have been used in the past for these types of applications, the cost and time associated with receiving the desired images is much greater than that offered by a UAV. In addition, satellites and aircraft only provide a top view of the area being imaged, and are therefore inadequate for many applications in which different angles are required.

Camera-equipped UAVs solve a number of these problems. However, generation of accurate three-dimensional (3D) scans of landscapes, buildings, etc., requires coordination between the location of the UAV and orientation of the camera. Typically, this requires setting a pre-defined flight plan of the UAV and collecting image data. Subsequently, the image data is analyzed and reconstructed to form 3-D models of the area scanned, and then subsequent flights are planned to image areas in which image information is insufficient. As a result, both the time and cost required to scan the desired area becomes prohibitive.

Therefore, it would be desirable to develop a system that decreases the time and cost of generating scans based on sensors mounted to UAVs.

SUMMARY

According to one embodiment, a method of imaging an area using an unmanned aerial vehicle (UAV) collects a plurality of images from a sensor mounted to the UAV. The plurality of images are processed to detect regions that require additional imaging and an updated flight plan and sensor gimbal position plan is created to capture portions of the area identified as requiring additional imaging.

According to another embodiment, a method of orientating a camera gimbal assembly during image capture from an unmanned aerial vehicle (UAV) includes storing a flight plan and gimbal position plan for the camera gimbal assembly that determines desired regions of interest to be imaged during a planned flight. During the planned flight, the flight controller receives positional information that indicates a current position of the UAV and orientation information from inertial measurement unit that indicates the orientation of the UAV. Based on the stored flight plan, the gimbal position plan, the received positional information, and the orientation information a modified position for the camera gimbal assembly is calculated to maintain the camera focused on a desired region of interest. The modified position is provided to the camera gimbal assembly to correct the orientation of the camera to capture a desired region of interest.

DETAILED DESCRIPTION

Figure 1:
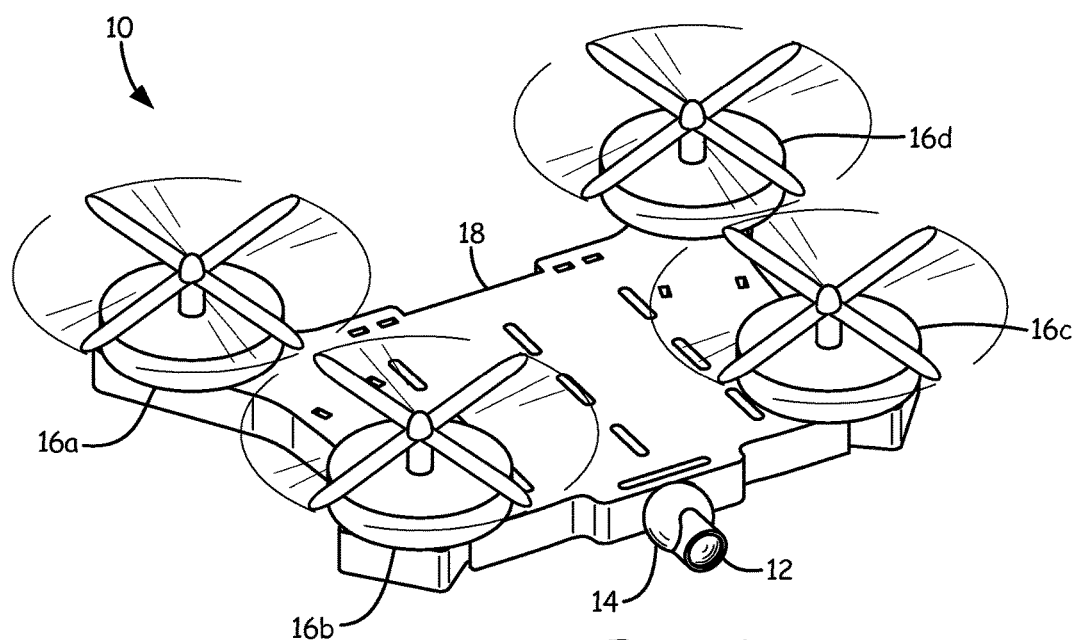
FIG. 1 is a perspective view of an unmanned aerial vehicle with an integrally formed camera and gimbal system according to an embodiment of the present invention.

FIG. 1 is a perspective view of unmanned aerial vehicle (UAV) 10 with an integrally formed camera 12 and gimbal assembly 14 according to an embodiment of the present invention. In the embodiment shown in FIG. 1, UAV 10 is a quad-copter that includes four rotor assemblies 16a-16d and chassis 18. In other embodiments UAV 10 utilizes a different configuration of rotors and/or propellers. In some embodiments, it is desirable that UAV 10 be able to hover during the capture of images, while in other applications it may be permissible for UAV 10 to be moving during image capture. For applications in which hovering is not required, UAV 10 may incorporate an airplane-like design that does not rely on rotor assemblies.

Chassis 18 houses electronics associated with UAV 10, including global positioning system (GPS) circuits, flight controllers, inertial management units (IMUs), and other necessary equipment (e.g., memory units, processors, etc.). In the embodiment shown in FIG. 1, chassis 18 is integrally formed with camera 12 and gimbal assembly 14. In other embodiments, the camera and gimbal system may be attached or otherwise supported external of chassis 18. However, by integrating camera 12 and gimbal assembly 14 as part of chassis 18, these components can be located at a position that is proximate to or co-located with the center of gravity (COG) of UAV 10. A benefit of this configuration is that the orientation of the UAV is approximately the same as the orientation of the camera and gimbal assembly. That is, a change in the detected orientation of the UAV results in a similar change in orientation of the camera. However, in other embodiments the camera and gimbal assembly may be located in an area offset from the COG of UAV 10, such as underneath chassis 18.

Camera 12 includes a sensor unit for capturing images, and is selected based on the application. For example, camera 12 may be a visible light camera or infrared camera, and may capture image data or video data. Gimbal assembly 14 allows camera 12 to be oriented in one, two or three dimensions depending on the number of gimbals employed. In one embodiment, a three-axis gimbal assembly is employed to allow the camera to be oriented in three-dimensional space. As discussed in more detail below, gimbal assembly 14 includes a controller that is responsible for orienting camera 12 at a desired target for image capture. For example, UAV 10 will be programmed with a flight plan that describes the path the UAV should take to capture the desired images. In addition, UAV 10 will be programmed with a gimbal position plan that indicates at each position of UAV 10 the desired viewing angle or orientation of camera 12. In this way, gimbal assembly 14 is able to position camera 12 at different viewing angles to capture a desired region of interest As discussed in more detail with respect to FIG. 2, additional feedback is provided to allow gimbal assembly 14 to remain focused on a static or dynamically changing region of interest despite variations in aircraft position and/or orientation.

Figure 2:
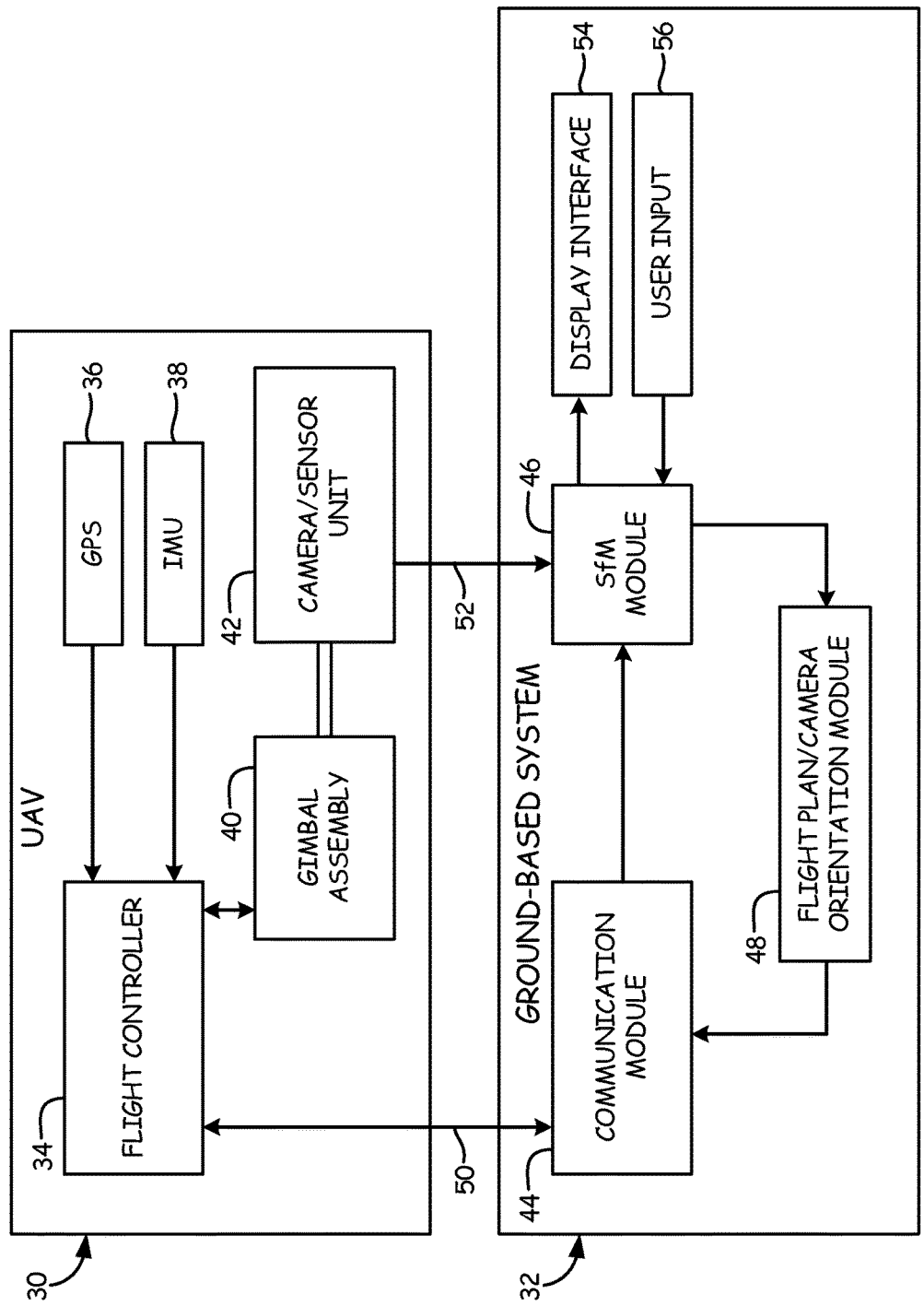
FIG. 2 is a block diagram that illustrates communication between components located on the UAV and a ground-based system according to an embodiment of the present invention.

FIG. 2 is a block diagram that illustrates communication between components located on UAV 30 and ground-based system 32 according to an embodiment of the present invention. In particular, the embodiment shown in FIG. 2 illustrates components used to control the operation of UAV 30, including flight controller 34, GPS 36, inertial measurement unit 38, gimbal assembly 40, and camera/sensor unit 42. Ground-based system 32 includes communication module 44, Structure from Motion (SfM) module 46, flight plan/camera orientation module 48, display interface 54 and user input interface 56. In the embodiment shown in FIG. 2, UAV 30 and ground-based system 32 communicate via two communication channels. First communication channel 50 located between flight controller 34 (on UAV 30) and communication module 44 (part of ground-based system 32) communicates position/orientation information—related both to UAV 30 and camera/sensor unit 42—from UAV 30 to ground-based system 32, and communicates updated/modified flight plan/camera orientation plan data from ground-based system 32 to UAV 30. Second communication channel 52 communicates image data from camera/sensor unit 42 to SfM module 46 for processing. In other embodiments, the same communication channel may be used for all communication between UAV 30 and ground-based system 32.

Flight controller 34 is responsible for controlling the flight path of UAV 30. In the embodiment shown in FIG. 2, flight controller 34 stores a flight plan that dictates the position and/or orientation of UAV 30. In particular, flight controller compares current position/orientation information with the desired position/orientation information stored by the flight plan, and controls flight surfaces and/or rotors associated with UAV 30 to minimize the difference between the detected position and the desired position. For example, in the embodiment shown in FIG. 2, flight controller 34 receives position information from global positioning system (GPS) 36 and receives orientation information from inertial management unit (IMU) 38. In addition to utilizing these inputs to control the operation of UAV 30, flight controller also provides these inputs as feedback to other systems (such as gimbal assembly 40) for use in determining the proper orientation of camera/sensor unit 42.

Gimbal assembly 40 is responsible for controlling the position and/or orientation of camera 42. In the embodiment described with respect to FIG. 2, gimbal assembly 40 includes processing capability that allows gimbal assembly 40 to determine the correct orientation of camera/sensor unit 42 based on the current position/orientation of UAV 30 as provided by flight controller 34. However, it should be recognized that this function could be maintained as part of flight controller 34, in which case flight controller 34 would provide command instructions to gimbal assembly 40 indicating the commanded orientation of camera/sensor unit 42.

In the embodiment shown in FIG. 2, gimbal assembly 40 stores a camera position/orientation plan that identifies the desired position/orientation of camera 42 at each location of UAV 30 along the flight path. The position/orientation plan may be defined in the form of pan, tilt, zoom (PTZ) coordinates defined for each position of UAV 30, or may be stored as coordinates in a three-dimensional space. Gimbal assembly 40 receives position/orientation updates from flight controller 34, and based on the received position/orientation information and stored camera position/orientation plan, gimbal assembly 40 selectively modifies the orientation of camera 42 to maintain camera 42 directed to and focused on the desired region of interest. That is, gimbal assembly does not merely orient camera/sensor unit 42 based on the expected or planned location of UAV 30, but utilizes real-time updates of both UAV position (e.g., GPS data) and UAV orientation (e.g., IMU data), along with information about the desired region of interest as defined by the camera position/orientation plan, to determine the correct position/orientation of camera/sensor unit 42. A benefit of this approach is that camera/sensor unit 42 remains focused on the desired region of interest despite variations or errors in the position and/or orientation of UAV 30.

Gimbal assembly 40 also provides gimbal assembly position/orientation information in feedback to flight controller 34. As discussed in more detail below, this information may in turn be provided by flight controller 34—along with UAV position/orientation information to ground-based system 32 for use in image processing the received images. For example, in one embodiment gimbal assembly provides PTZ coordinates that when paired with position/orientation information associated with UAV 30 can be used to determine the 3D coordinates of a captured image. In other embodiments, gimbal assembly 40—already in possession of UAV position/orientation information based on feedback provided by flight controller 34—calculates 3-D coordinates for each image captured and provides the 3-D coordinates themselves to flight controller 34 for subsequent communication to ground-based system 32. In other embodiment, gimbal assembly 40 provides both camera orientation/position information and information related to the 3-D or real-world coordinates of captured images. In the embodiment shown in FIG. 2, this information is provided to flight controller 34 for communication to ground-based system 32, but in other embodiments this information may be embedded as part of the image data communicated by camera 42 to ground-based system 32.

In this way, position and/or orientation information associated with UAV 30 is collected by flight controller 34 and utilized in conjunction with a stored flight plan to control the flight path of UAV 30. In addition, position and/or orientation information is provided as feedback to gimbal assembly 40, which utilizes the information along with a stored camera position/plan (e.g., desired region of interest) to selectively orient camera 42 to maintain focus on the desired region of interest despite errors in the position/orientation of UAV 30. In one embodiment, position and/or orientation information is provided at each time-step of gimbal assembly 40 in order to maintain the correct orientation of camera 42.

In addition to internal communications, flight controller 34 also communicates flight path/orientation data and image data to ground-based image processing system 32. In the embodiment shown in FIG. 2, flight controller 34 communicates bi-directionally with communication module 44 included as part of ground-based image processing system 32 via a first wireless communication path 50 that handles position/orientation, while camera 42 communicates image data to SfM module 46 via second wireless communication path 52. In one embodiment, first wireless communication path 50 utilizes a MAVlink protocol for communication of position and/or orientation information. In addition, first wireless communication path 50 may be utilized by ground-based system 32 to provide updated flight plan and/or camera orientation plan to dynamically modify the area to be scanned and/or the region of interest to be studied. In this way, ground-based image processing system 32 receives updates regarding the position and/or orientation of UAV 30, and if desired, can provide UAV 30 with updated flight plan information to dynamically change the flight path of UAV 30. In addition to position and/or orientation information associated with UAV 30, flight controller 34 may also provide position and/or orientation information associated with camera/sensor unit 42, and ground-based image processing system 32 can respond by providing UAV 30 with an updated camera orientation plan.

In one embodiment, ground-based image processing system 32 receives image data from camera 42 and utilizes SfM module 46 to analyze the image data. Analysis of image data may occur while UAV 30 is air-borne, or may occur between flights of UAV 30. While substantive image analysis and modeling—which is more time-consuming—may be completed at a subsequent time, SfM module 46 is capable of providing real-time or near real-time analysis of collected image data to detect gaps in the image data (e.g., areas in which the image data provided is insufficient). A benefit of this capability is that determinations can be made while UAV 30 is still in the field, and modified/updated flight plans and camera orientation plans can be dynamically created and communicated to UAV 30 (by flight play/camera orientation module 48) to collect the desired image data. Conversely, without this capability, image data is analyzed well after UAV 30 has left the field or area to be scanned, and subsequent trips must be coordinated to retrieve image data from those areas not properly scanned the first time.

In the field, SfM module 46 is utilized to analyze received images and determine whether sufficient information has been captured to allow for subsequent 3-D or topographical modeling of the desired area. That is, SfM module 46 must determine whether any gaps exist in the data collected that must be filled. The ability to do this in real-time or near real-time (i.e., before UAV 30 leaves the field) is important to lowering the cost and time required to scan an area. To do this, SfM module 46 must pair image data received from camera/sensor unit 42 with location information. This may be accomplished in a number of different ways. For example, as discussed above, flight controller 34 may provide location/orientation information with respect to both UAV 30 and camera/sensor unit 42 to communication module 44, which provides the information to SfM module 46 for analysis. In other embodiments, rather than location/orientation information of both UAV 30 and camera/sensor unit 42, flight controller 34 or gimbal assembly 40 determines based on location/orientation of UAV 30 and camera/sensor unit 42 three-dimensional or real-world coordinates that can be associated with each image received by SfM module 46. In another embodiment, position/orientation and/or 3-D coordinate data is paired with image data at the time of capture by camera/sensor unit 42, and included with image data communicated to SfM module 46. In each of these embodiments, location/orientation information associated with UAV 30, as well as position/orientation information associated with camera/sensor unit 42, is utilized to determine the 3-D coordinates associated with the captured image. Whether this is done on-board UAV 30 or as part of ground-based system 32 depends on the application.

Having calculated or otherwise obtained information identifying the position of each image, SfM module 46 next determines the sufficiency of the image data captured. In one embodiment, SfM module 46 utilizes images received from camera 42 to create a point-cloud reconstruction of the area scanned. The point-cloud reconstruction is divided into a plurality of sections and the number of "points" existing in each section is compared to a threshold value to determine whether sufficient data has been collected with respect to the section. Those sections having fewer points than the threshold can be identified as having insufficient image data. Based on the results of this analysis, SfM module 46 identifies the region of interest and provides this information to flight plan/camera orientation module 48 to create a modified or updated flight plan for UAV 30 and modified or updated camera orientation plan for gimbal assembly 40. The updated flight plan and camera orientation plan is communicated to flight controller 34 via communication module 44 and first communication channel 50. In this way, complete information regarding the area/structure to be scanned is obtained while UAV 30 is still in the field. That is, image analysis can be done in real-time or near real-time such that UAV 30 can be directed to a desired region of interest dynamically.

In one embodiment, SfM module 46 uses a specified approach to decrease the analysis time associated with image analysis and point-cloud reconstruction. First, position/orientation information paired with each image is utilized to detect overlap between received images. Those images that do not overlap with any other images are discarded from the image analysis batch. This is in contrast with traditional image analysis systems which conduct comprehensive image processing of all images without prior information on whether or not the images or overlap with one another. Next, overlapping images are organized into groups that allow for parallel processing of each group. In one embodiment, for each group of overlapping images, point-cloud reconstructions of scanned structures are created. Each point in the point-cloud is defined within an axis space (e.g., three-axis coordinate, x, y, and z), and represent the external surface of an object scanned. The density of points within a given region determines how accurately and with how much precision the scanned object or terrain can be re-constructed. Therefore, the number of points within a given region of the scanned image can be utilized a determining factor of whether sufficient image information has been collected. In one embodiment, for each given region of defined size, the number of points or density of points is compared to a threshold value. If the number or density of points is less than the threshold value, a determination is made that initial image information was insufficient, and subsequent image information for the region is requested.

In another embodiment, in addition to point-cloud reconstruction and determinations of whether regions have sufficient point density, SfM module 46 may also rely on user interaction to determine whether the image data collected is sufficient. In one embodiment, SfM module 46 displays image data to the user via display interface 54, and allows the user to provide feedback via input device 56 (e.g., keyboard, touchscreen, etc.). In this way, SfM module 46 allows a user to load, order, delete, and inspect images that will be processed, as well as manually determine that particular regions of interest require additional imaging. For example, a user manually reviewing images may determine that glare from the sun has rendered an image unusable or that a particular image is out-of-focus, the user may indicate that the image should be deleted from the group being analyzed. This manual interaction from the user can be used as a filter to ensure images analyzed by SfM module 46 do not include defects that will skew the results of the point-cloud or other SfM analysis. Once satisfied with the image set or group of images, a user may provide an indication to SfM module 46 to execute or run the SfM (e.g., point-cloud) analysis. Manual intervention on behalf of a user is provided in conjunction with analysis performed by SfM module 46 (e.g., point-cloud density determinations, etc.).

Having determined areas requiring additional image information to be collected, flight plan module 48 creates or modifies an existing flight plan of UAV 30 to position the UAV to capture images in regions identified as insufficient. In addition, flight plan module 48 may create and/or modify camera orientation plans as required to capture the required image data. If a plurality of regions requires additional imaging, flight plan module 48 creates a flight plan that will minimize the time required or distance traveled by UAV 30. Newly created or modified flight plans and/or camera orientation plans are uploaded to flight controller 34 via the first wireless communication link 50.

This process continues until all required image data, as determined by SfM module 46 has been collected for a given region. A benefit of the ability to analyze image data in real-time for, at the very least, a determination of whether sufficient image data has been captured, is that it allows for real-time updating of flight plans and camera orientations of UAV 30 to capture the desired image information while UAV 30 is still in the field.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of imaging an area using an unmanned aerial vehicle (UAV), the method comprising:
   collecting a plurality of images from a sensor mounted to the UAV;
   processing the plurality of images to detect regions that require additional imaging, wherein processing the plurality of images includes generating a point-cloud reconstruction of the area being imaged and comparing point density of areas to a threshold value wherein a point density of an area less than the threshold value indicates further imaging is required; and
   creating a flight plan and sensor gimbal position plan to capture portions of the area identified as requiring additional imaging.

2. The method of claim 1, further including:
   receiving from the UAV positional and orientation information that describes the position and orientation of the UAV; and
   associating the UAV positional and orientation information with each image collected by the sensor mounted to the UAV.

3. The method of claim 2, further including:
   receiving from the UAV gimbal orientation information that describes the orientation of the camera gimbal assembly; and
   associating the UAV gimbal orientation information with each image collected by the sensor mounted to the UAV.

4. The method of claim 3, wherein processing the plurality of images includes utilizing UAV positional and orientation information and gimbal orientation information associated with each image to detect images that overlap with one another, wherein overlapping images are grouped together.

5. The method of claim 4, wherein processing the plurality of images further includes only processing images determined to overlap with other images.

6. The method of claim 5, wherein processing the plurality of images further includes processing in parallel groups of images determined to overlap with one another.

* * * * *